United States Patent
Zhang et al.

(10) Patent No.: US 10,717,947 B2
(45) Date of Patent: Jul. 21, 2020

(54) SOLID COMPOSITION COMPRISING A QUATERNARY AMMONIUM COMPOUND AND POLYSACCHARIDE, THE PROCESS AND USE THEREOF

(71) Applicant: RHODIA OPERATIONS, Paris (FR)

(72) Inventors: Hai Zhou Zhang, Singapore (SG); Nikolay Christov, Singapore (SG); Da Wei Jin, Singapore (SG); Lin He, Singapore (SG)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 15/538,057

(22) PCT Filed: Dec. 22, 2015

(86) PCT No.: PCT/EP2015/080905
§ 371 (c)(1),
(2) Date: Jun. 20, 2017

(87) PCT Pub. No.: WO2016/102527
PCT Pub. Date: Jun. 30, 2016

(65) Prior Publication Data
US 2017/0349859 A1   Dec. 7, 2017

(30) Foreign Application Priority Data
Dec. 22, 2014   (WO) ................. PCT/EP2014/079039

(51) Int. Cl.
| | | |
|---|---|---|
| *C11D 3/37* | (2006.01) | |
| *C11D 1/62* | (2006.01) | |
| *D06M 23/08* | (2006.01) | |
| *D06M 13/46* | (2006.01) | |
| *D06M 15/03* | (2006.01) | |
| *C11D 3/22* | (2006.01) | |
| *C11D 3/43* | (2006.01) | |
| *C08K 5/19* | (2006.01) | |

(52) U.S. Cl.
CPC ................. *C11D 1/62* (2013.01); *C08K 5/19* (2013.01); *C11D 3/222* (2013.01); *C11D 3/227* (2013.01); *C11D 3/43* (2013.01); *D06M 13/46* (2013.01); *D06M 15/03* (2013.01); *D06M 23/08* (2013.01); *D06M 2200/50* (2013.01)

(58) Field of Classification Search
CPC ....... C11D 11/0017; C11D 3/001; C11D 1/62; C11D 3/0015; C11D 3/3761; C11D 3/222
See application file for complete search history.

(56) References Cited

U.S. PATENT DOCUMENTS

| | | | |
|---|---|---|---|
| 2,813,093 A | 11/1957 | Caldwell et al. | |
| 3,472,840 A | 10/1969 | Stone et al. | |
| 4,119,487 A | 10/1978 | Tessler et al. | |
| 4,131,576 A | 12/1978 | Iovine et al. | |
| 4,237,016 A | 12/1980 | Howard et al. | |
| 4,808,321 A | 2/1989 | Darlene et al. | |
| 5,066,414 A | 11/1991 | Chang et al. | |
| 5,531,910 A | 7/1996 | Severns et al. | |
| 6,492,322 B1 | 12/2002 | Cooper et al. | |
| 10,155,918 B2 * | 12/2018 | Zhang ................. | C11D 3/227 |
| 2007/0167347 A1 * | 7/2007 | Gallotti ................. | C11D 1/835 |
| | | | 510/515 |
| 2011/0023240 A1 * | 2/2011 | Fossum .................... | C11D 1/62 |
| | | | 8/137 |
| 2011/0182956 A1 * | 7/2011 | Glenn, Jr. ............ | A61K 8/0216 |
| | | | 424/401 |
| 2012/0122997 A1 * | 5/2012 | Abbott ..................... | C08K 5/19 |
| | | | 514/778 |

FOREIGN PATENT DOCUMENTS

| | | |
|---|---|---|
| EP | 1502942 A1 | 2/2005 |
| EP | 2459690 B1 | 5/2013 |
| FR | 1492597 A | 8/1967 |
| WO | 06055787 A1 | 5/2006 |
| WO | 2011014643 A1 | 7/2010 |
| WO | 2011001142 A1 | 1/2011 |

OTHER PUBLICATIONS

Poucher, Journal of the Society of Cosmetic Chemists, 1955, vol. 6, No. 2, p. 80-94.
K.L.Hodges et al., Determination of Alkoxyl Substitution in Cellulose Ethers by Zeisel-Gas Chromatography, Analytical Chemistry, 1979, vol. 51, No. 13.

* cited by examiner

*Primary Examiner* — John R Hardee
(74) *Attorney, Agent, or Firm* — Jarrod N. Raphael

(57) ABSTRACT

The present invention provides a solid composition comprising (a) a quaternary ammonium compound and (b) between 9 wt % and 77 wt % of a polysaccharide based on the total weight of the solid composition. The solid composition showed excellent stability. The present invention also provides a process for preparing the solid composition and a liquid composition comprising said solid composition, and methods for conditioning a fabric by using the solid composition and the liquid composition as well.

13 Claims, No Drawings

SOLID COMPOSITION COMPRISING A QUATERNARY AMMONIUM COMPOUND AND POLYSACCHARIDE, THE PROCESS AND USE THEREOF

This application claims priority to PCT international application No. PCT/EP2014/079039 filed on 22 Dec. 2014, the whole content of this application being incorporated herein by reference for all purposes.

TECHNICAL FIELD

The present invention relates to a solid composition comprising a quaternary ammonium compound and a polysaccharide. Preferably, the solid composition is substantially free or completely free of water. The solid composition can be used for various home care and personal care applications, in particular, for fabric conditioning applications.

BACKGROUND ART

Aqueous systems have been widely used for home care and personal care applications by consumers or industrial users. Such aqueous systems, for example, aqueous fabric conditioning compositions, comprise large amount of water, and therefore, they require a great amount of packaging materials and large shelf space. Also, transportation of such aqueous systems is expensive. One solution to solve these problems is to provide solid systems for home care and personal care applications, such as solid fabric conditioning compositions.

Referring to fabric conditioning compositions, such compositions generally comprise one or more fabric conditioning actives. One widely used fabric conditioning active is quaternary ammonium compound which generally comprise long chain alkyl groups connected to the nitrogen atom. Quaternary ammonium compounds are known to impart fabrics "softness". One significant improvement in the fabric conditioning field is to use quaternary ammonium compound with at least one ester functional group inserted in some or all of the long chain alkyl groups. Such quaternary ammonium compounds are called "ester quaternary ammonium compounds" or "ester quats". One advantage of ester quats is that they are rapidly biodegradable, thus more eco-friendly. Use of ester quats for fabric conditioning compositions has been described, e.g. in U.S. Pat. No. 4,808,321 issued on Feb. 28, 1989; U.S. Pat. No. 5,066,414 issued on Nov. 19, 1991; U.S. Pat. No. 5,531,910 issued on Jul. 2, 1996.

Another development in the fabric conditioning field is addition of cationic polymers to the fabric conditioning compositions for various benefits. Useful cationic polymers include cationic polysaccharide. Such use of the cationic polysaccharides has been described, e.g. in U.S. Pat. No. 4,237,016 issued on Dec. 2, 1980, U.S. Pat. No. 6,492,322 issued on Dec. 10, 2002.

There are certain problems associated with known fabric conditioning systems comprising ester quats and cationic polysaccharides. For example, ester quats are susceptible to degradation, especially when they are present in high concentrations in water. This phenomenon may be due to their biodegradable nature. Furthermore, when quats coexist with polysaccharides, such as cationic polysaccharides, in a liquid system, the system is usually unstable. In particular, the quat component and the polysaccharide component tend to undergo phase separation.

There is a need to provide stable compositions which incorporate quaternary ammonium compounds and polysaccharides, especially stable compositions incorporate quaternary ammonium compounds and polysaccharides at high concentrations.

SUMMARY OF INVENTION

It has been found that the above problems can be solved by the present invention.

In a first aspect of the present invention, there is provided a solid composition comprising:
(a) a quaternary ammonium compound; and
(b) between 9 wt % and 77 wt % of a polysaccharide based on the total weight of the solid composition.

Notably, the solid composition comprises (a) 50 wt % or above of the quaternary ammonium compound and (b) between 9 wt % and 50 wt % of the polysaccharide; weight percentages are based on the total weight of the solid composition.

In particular, the solid composition comprises (a) between 50 wt % and 91 wt % of the quaternary ammonium compound and (b) between 9 wt % and 50 wt % of the polysaccharide; weight percentages are based on the total weight of the solid composition.

Preferably, the solid composition does not comprise any carrier material.

The quaternary ammonium compound may have the general formula (I):

$$[N^+(R_1)(R_2)(R_3)(R_4)]_y X^- \qquad (I)$$

wherein: $R_1$, $R_2$, $R_3$ and $R_4$, which may be the same or different, is a $C_1$-$C_{30}$ hydrocarbon group, optionally containing a heteroatom or an ester or amide group;
X is an anion;
y is the valence of X.

Preferably, the quaternary ammonium compound have the general formula (III):

$$[N^+((CH_2)_n\text{-}T\text{-}R_8)_2(R_8)(R_9)]_y X^- \qquad (III)$$

wherein:
$R_9$ group is independently selected from $C_1$-$C_4$ alkyl or hydroxylalkyl group;
$R_8$ group is independently selected from $C_1$-$C_{30}$ alkyl or alkenyl group;
T is —C(=O)—O— or —O—C(=O)—;
n is an integer from 0 to 5;
X is an anion;
y is the valence of X.

Notably, the quaternary ammonium compound has the general formula (IV):

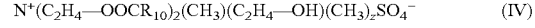

$$N^+(C_2H_4\text{—OOCR}_{10})_2(CH_3)(C_2H_4\text{—OH})(CH_3)_2SO_4^- \qquad (IV)$$

wherein $R_{10}$ is a $C_{12}$-$C_{20}$ alkyl group;
z is an integer from 1 to 3.

In some aspects, the polysaccharide is a cationic polysaccharide and a nonionic polysaccharide.

Notably, the polysaccharide is a cationic guar and a nonionic guar

In a second aspect of the present invention, there is provided a process for preparing a solid composition comprising the steps of
(i) providing a quaternary ammonium compound in liquid form;
(ii) combining a polysaccharide with the quaternary ammonium compound to obtain a mixture;
(iii) solidifying the mixture;

wherein the solid composition comprises between 9 wt % and 77 wt % of the polysaccharide based on the total weight of the solid composition.

Preferably, in the process, the solid composition comprises (a) 50 wt % or above of the quaternary ammonium compound; and (b) between 9 wt % and 50 wt % of the polysaccharide; weight percentages are based on the total weight of the solid composition.

In particular, the solid composition comprises (a) between 50 wt % and 91 wt % of the quaternary ammonium compound; and (b) between 9 wt % and 50 wt % of the polysaccharide; weight percentages are based on the total weight of the solid composition.

Notably, the step (i) is melting the quaternary ammonium compound and the step (iii) is cooling the mixture.

In a third aspect of the present invention, there is provided a process for preparing a liquid composition, comprising the step of mixing the solid composition according to the first aspect of the present invention with a solvent selected from water, an organic solvent or a mixture thereof.

In a fourth aspect of the present invention, there is provide a method for conditioning a fabric, comprising the step of contacting the fabric with the solid composition according to the first aspect of the present invention during a drying cycle of a dryer.

The present invention also provides a method for conditioning a fabric, comprising the step of contacting the fabric with an aqueous medium comprising the liquid composition prepared by using the process according to the third aspect of the present invention during a rinse cycle of an automatic laundry machine or during manual wash.

DETAILED DESCRIPTION OF THE INVENTION

Throughout the description, including the claims, the term "comprising one" or "comprising a" should be understood as being synonymous with the term "comprising at least one", unless otherwise specified, and "between", "from . . . to . . . " should be understood as being inclusive of the limits.

As used herein, "weight percent," "wt %," "percent by weight," "% by weight," and variations thereof refer to the concentration of a substance as the weight of that substance divided by the total weight of the composition and multiplied by 100.

"Alkyl" as used herein means a straight chain or branched saturated aliphatic hydrocarbon group and is intended to include both "unsubstituted alkyls" and "substituted alkyls", the latter of which refers to alkyl moieties having substituents (such as hydroxyl group and halogen group) replacing a hydrogen on one or more carbon atoms of the alkyl group.

"Alkenyl", as used herein, refers to an aliphatic group containing at least one double bond and is intended to include both "unsubstituted alkenyls" and "substituted alkenyls", the latter of which refers to alkenyl moieties having substituents (such as hydroxyl group and halogen group) replacing a hydrogen on one or more carbon atoms of the alkenyl group.

As used herein, the term "solid composition" refers a composition in the form of a solid such as a powder, a particle, an agglomerate, a flake, a granule, a pellet, a tablet, a brick, a paste, a block such as a molded block, a unit dose, or another solid form known to those of skill in the art. The term "solid" refers to the state of the composition under the expected conditions of storage and use of the composition. In general, it is expected that the composition will remain in solid form at ambient temperature (approximately 25° C.), preferably, the composition will remain in solid form when exposed to the temperatures of 35° C. When referring to a paste, it is meant that the solid composition will not flow perceptibly and will substantially retain its shape under moderate stress or pressure or mere gravity, as for example, the shape of a mold when removed from the mold, the shape of an article as formed upon extrusion from an extruder, and the like.

The term "solidifying" means the process of making a liquid, such as a melt, into solid form.

The term "liquid" as used herein means that a continuous phase or predominant part of the composition is liquid and that a composition is flowable. It is understood herein that liquid includes a melt.

The term "quaternary ammonium compound" as used herein refers to a compound containing at least one quaternized nitrogen wherein the nitrogen atom is attached to four organic groups. The quaternary ammonium compound may comprise one or more quaternized nitrogen atoms.

The term "polysaccharide" as used herein includes polysaccharide and its derivatives.

The term "cationic polysaccharide" as used herein refers to a cationic derivative of a polysaccharide. "Cationic" means permanently positively charged whatever the pH or non permanently charged, e.g. a derivative that can be cationic below a given pH and neutral above that pH. Non-modified polysaccharides, such as starch, cellulose, pectin, carageenan, guars, xanthans, dextrans, curdlans, chitosan, chitin, and the like, can be chemically modified to impart cationic charges thereon. A common chemical modification incorporates quaternary ammonium substituents to the polysaccharide backbones. Additional chemical modifications may include cross-linking, stabilization reactions (such as alkylation and esterification), phophorylations, hydrolyzations.

The term "nonionic polysaccharide" as used herein refers to a polysaccharide derivative that has been chemically modified to provide the polysaccharide derivative with a net neutral charge in a pH neutral aqueous medium; or a non-modified polysaccharide.

The term "amphoteric polysaccharide" as used herein refers to a polysaccharide derivative that has been chemically modified to bear both an anionic charge and a cationic charge.

In the context of this invention, the term "fabric conditioning" is used in the broadest sense to include any conditioning benefit(s) to textile fabrics, materials, yarns, and woven fabrics. One such conditioning benefit is softening fabrics. Other non-limiting conditioning benefits include fabric lubrication, fabric relaxation, durable press, wrinkle resistance, wrinkle reduction, ease of ironing, abrasion resistance, fabric smoothing, anti-felting, anti-pilling, crispness, appearance enhancement, appearance rejuvenation, color protection, color rejuvenation, anti-shrinkage, in-wear shape retention, fabric elasticity, fabric tensile strength, fabric tear strength, static reduction, water absorbency or repellency, stain repellency; refreshing, anti-microbial, odor resistance; perfume freshness, perfume longevity, and mixtures thereof.

In one aspect, the present invention provides a solid composition comprising:
  (a) a quaternary ammonium compound; and
  (b) between 9 wt % and 77 wt % of a polysaccharide based on the total weight of the solid composition.

Notably, the present invention provides a solid composition comprising:
  (a) 50 wt % or above of a quaternary ammonium compound; and
  (b) between 9 wt % and 50 wt % of a polysaccharide; weight percentages are based on the total weight of the solid composition.

In particular, the present invention provides a solid composition comprising:
(a) between 50 wt % and 91 wt % of a quaternary ammonium compound; and
(b) between 9 wt % and 50 wt % of a polysaccharide;
weight percentages are based on the total weight of the solid composition.

Preferably, the solid composition of the present invention is substantially free or completely free of water. As used herein, the term "substantially free" when used with reference to the absence of water in the composition of the present invention, means that the composition comprises less than 0.1 wt % of water, more preferably less than 0.01 wt % of water, based on the total weight of the composition. As used herein, the term "completely free" when used with reference to the absence of water (ie. 0 wt % of water) in the composition of the present invention, means that the composition comprises no water at all.

The solid composition according to the present invention may be in any solid form, such as a powder, a particle, an agglomerate, a flake, a granule, a pellet, a tablet, a brick, a paste, a block such as a molded block, a unit dose, and the like.

The solid composition of the present invention may be used for various applications. In one aspect, the solid composition may be used as, or used for preparing, home care compositions or personal care compositions. Examples of the home care compositions include and are not limited to laundry detergents, fabric conditioning compositions, dishwashing liquids, wood and furniture polish, floor polish, tub and tile cleaners, toilet bowl cleaners, hard surface cleaners, window cleaners, antifog agents, drain cleaners, auto-dish washing detergents and sheeting agents, carpet cleaners, prewash spotters, rust cleaners and scale removers. Examples of the personal care compositions include and are not limited to shampoos, conditioning shampoos, body washes, moisturizing body washes, shower gels, skin cleansers, cleansing milks, in shower body moisturizers, pet shampoos, shaving preparations.

Quaternary Ammonium Compound

The solid composition according to the present invention comprises a quaternary ammonium compound (also referred to as "quat"). Suitable quat may be a compound of the general formula (I):

  (I)

$[N^+(R_1)(R_2)(R_3)(R_4)]_y X^-$ wherein:
$R_1$, $R_2$, $R_3$ and $R_4$, which may be the same or different, is a $C_1$-$C_{30}$ hydrocarbon group, typically an alkyl, hydroxyalkyl or ethoxylated alkyl group, optionally containing a heteroatom or an ester or amide group;
X is an anion, for example halide, such as Cl or Br, sulphate, alkyl sulphate, nitrate or acetate;
y is the valence of X.

In some aspects, at least one of $R_1$, $R_2$, $R_3$ and $R_4$ contains an ester linkage group (ester link). Preferably, at least two of $R_1$, $R_2$, $R_3$ and $R_4$ contain an ester link.

The quat may be a compound of general formula (II):

  (II)

$[N^+(R_5)_2(R_6)(R_7)]_y X^-$ wherein:
$R_5$ is an aliphatic $C_{1-30}$ group; preferably $R_5$ contains an ester link;
$R_6$ is a $C_1$-$C_4$ alkyl group;
$R_7$ is $R_5$ or $R_6$;
X is an anion, for example halide, such as Cl or Br, sulphate, alkyl sulphate, nitrate or acetate;
y is the valence of X.

The quat may be di-(hardened tallow) dimethyl ammonium chloride.

In aspects where the solid composition is used as, or used for preparing, a fabric conditioning composition, the quat is preferably an ester quat. in one embodiment, the ester quat is a compound of general formula (III):

  (III)

$[N^+((CH_2)_n\text{-}T\text{-}R_8)_2(R_8)(R_9)]_y X^-$ wherein:
$R_9$ group is independently selected from $C_1$-$C_4$ alkyl or hydroxylalkyl group;
$R_8$ group is independently selected from $C_1$-$C_{30}$ alkyl or alkenyl group;
T is —C(=O)—O— or —O—C(=O)—;
n is an integer from 0 to 5;
X is an anion, for example a chloride, bromide, nitrate or methosulphate ion;
y is the valence of X.

Preferably, the ester quaternary ammonium compound comprises two $C_{12-28}$ alkyl or alkenyl groups connected to the nitrogen head group, more preferably via at least one ester link. The quaternary ammonium compound may preferably have two ester links present.

Preferably, the average chain length of the alkyl or alkenyl group is at least $C_{14}$, more preferably at least $C_{16}$. Even more preferably at least half of the chains have a length of $C_{18}$.

The fatty acid chains of the ester quat may comprise from 20 to 35 weight percent of saturated $C_{18}$ chains and from 20 to 35 weight percent of monounsaturated $C_{18}$ chains by weight of total fatty acid chains. Preferably, the ester quat is derived from palm or tallow feedstocks. These feedstocks may be pure or predominantly palm or tallow based. Blends of different feedstocks may be used.

In one embodiment, the fatty acid chains of the ester quat comprise from 25 to 30 weight percent, preferably from 26 to 28 weight percent of saturated $C_{18}$ chains and from 25 to 30 weight percent, preferably from 26 to 28 weight percent of monounsaturated $C_{18}$ chains, by weight of total fatty acid chains. In another embodiment, the fatty acid chains of the ester quat comprise from 30 to 35 weight percent, preferably from 33 to 35 weight percent of saturated $C_{18}$ chains and from 24 to 35 weight percent, preferably from 27 to 32 weight percent of monounsaturated $C_{18}$ chains, by weight of total fatty acid chains.

In still another embodiment, the alkyl or alkenyl chains are predominantly linear, although a degree of branching, especially mid-chain branching, is within the scope of the invention.

In some aspects, the ester quat is triethanolamine-based quat of general formula (IV):

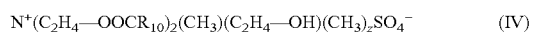  (IV)

$N^+(C_2H_4\text{—}OOCR_{10})_2(CH_3)(C_2H_4\text{—}OH)(CH_3)_2SO_4^-$ wherein $R_{10}$ is a $C_{12}$-$C_{20}$ alkyl group;
z is an integer from 1 to 3.

The quaternary ammonium compound of the present invention may also be a mixture of various quaternary ammonium compounds, notably for instance a mixture of mono-, di- and tri-ester components or a mixture of mono-, and di-ester components, wherein for instance the amount of diester quaternary is comprised between 30 and 99% by weight based on the total amount of the quaternary ammonium compound.

Preferably, the quaternary ammonium compound is a mixture of mono-, di- and tri-ester components, wherein:
the amount of di-ester quaternary is comprised between 30 and 70% by weight based on the total amount of the quaternary ammonium compound, preferably between 40 and 60% by weight, the amount of mono-ester quaternary is comprised between 10 and 60% by weight based on the total amount of the quaternary ammonium compound, preferably between 20 and 50% by weight, the amount of tri-ester quaternary is comprised between 1 and 20% by weight based on the total amount of the quaternary ammonium compound.

Alternatively, the quaternary ammonium compound is a mixture of mono- and di-ester components, wherein:

the amount of di-ester quaternary is comprised between 30 and 99% by weight based on the total amount of the quaternary ammonium compound, preferably between 50 and 99 by weight, the amount of mono-ester quaternary is comprised between 1 and 50% by weight based on the total amount of the quaternary ammonium compound, preferably between 1 and 20% by weight.

Preferred ester quaternary ammonium compounds of the present invention include:

TET: Di(tallowcarboxyethyl)hydroxyethyl methyl ammonium methylsulfate,

TEO: Di(oleocarboxyethyl)hydroxyethyl methyl ammonium methylsulfate,

TES: Distearyl hydroxyethyl methyl ammonium methylsulfate,

TEHT: Di(hydrogenated tallow-carboxyethyl)hydroxyethyl methyl ammonium methylsulfate, TEP: Di(palmiticcarboxyethyl)hydroxyethyl methyl ammonium methylsulfate, DEEDMAC: Dimethylbis[2-[(1-oxooctadecyl)oxy]ethyl] ammonium chloride.

In one exemplary embodiment, the quaternary ammonium compound is bis-(2-hydroxypropyl)-dimethylammonium methylsulphate fatty acid ester having a molar ratio of fatty acid moieties to amine moieties of from 1.5 to 1.99, an average chain length of the fatty acid moieties of from 16 to 18 carbon atoms and an iodine value of the fatty acid moieties, calculated for the free fatty acid, of from 0.5 to 60, and from 0.5 to 5% by weight fatty acid. Preferably, the bis-(2-hydroxypropyl)-dimethylammonium methylsulphate fatty acid ester is a mixture of at least one di-ester of formula:

and at least one mono-ester of formula:

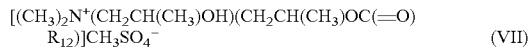

wherein $R_{12}$ is the hydrocarbon group of a fatty acid moiety $R_{12}COO-$.

Notably, such bis-(2-hydroxypropyl)-dimethylammonium methylsulphate fatty acid ester has a molar ratio of fatty acid moieties to amine moieties of from 1.85 to 1.99, the fatty acid moiety has an average chain length of from 16 to 18 carbon atoms and an iodine value, calculated for the free fatty acid, of from 0.5 to 60, preferably from 0.5 to 50. The average chain length is preferably from 16.5 to 17.8 carbon atoms. The iodine value is preferably from 5 to 40, more preferably, from 15 to 35. The iodine value is the amount of iodine in g consumed by the reaction of the double bonds of 100 g of fatty acid, which may notably be determined by the method of ISO 3961. In order to provide the required average chain length and iodine value, the fatty acid moiety may be derived from a mixture of fatty acids comprising both saturated and unsaturated fatty acids.

In another exemplary embodiment, the quaternary ammonium compound is a compound of the general formula:

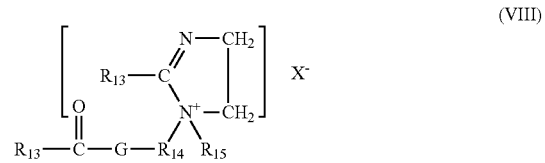

wherein $R_{15}$ is either hydrogen, a short chain $C_1$-$C_6$, preferably $C_1$-$C_3$ alkyl or hydroxyalkyl group, e.g. methyl, ethyl, propyl, hydroxyethyl, and the like, poly($C_2$-$C_3$ alkowy), preferably polyethoxy, benzyl, or mixtures thereof;

$R_{13}$ is a hydrocarbyl, or substituted hydrocarbyl group;

$X^-$ have the definitions given above;

$R_{14}$ is a $C_1$-$C_6$ alkylene group, preferably an ethylene group; and

G is an oxygen atom, or an $-NR_{10}-$ group wherein $R_{10}$ is as defined above.

A non-limiting example of compound (VIII) is 1-methyl-1-stearoylamidoethyl-2-stearoylimidazolinium methylsulfate.

In still another exemplary embodiment, the quaternary ammonium compound is a compound of the general formula:

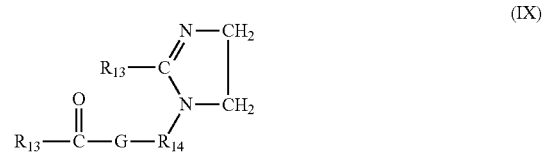

wherein $R_{13}$, $R_{14}$ and G are defined as above.

A non-limiting example of compound (IX) is 1-tallowylamidoethyl-2-tallowylimidazoline.

In still another exemplary embodiment, the quaternary ammonium compound is a compound of the general formula:

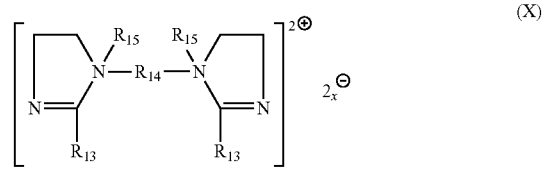

wherein $R_{13}$, $R_{14}$ and $R_{15}$ are defined as above.

A non-limiting example of compound (X) is

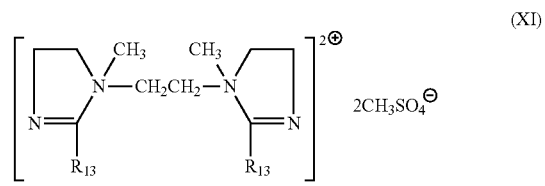

wherein $R_{13}$ is defined as above.

The solid composition of the present invention preferably comprises 20 wt % or above of the quaternary ammonium compound based on the total weight of the solid composition, more preferably, the solid composition comprises 30 wt % or above of the quaternary ammonium compound based on the total weight of the solid composition, even more preferably, the solid composition comprises 50 wt % or above of the quaternary ammonium compound based on the total weight of the solid composition. Notably, the solid composition comprises between 50 wt % and 91 wt % of the quaternary ammonium compound based on the total weight of the solid composition.

Polysaccharide

The solid composition according to the present invention comprises a polysaccharide. Preferably, the polysaccharide may be a cationic, nonionic or ampholytic polysaccharide. In aspects where the solid composition is used as, or used for preparing, a fabric conditioning composition, the polysaccharide is preferably a cationic polysaccharide or a nonionic polysaccharide.

A: Cationic Polysaccharide

Suitable cationic polysaccharides include cationic polysaccharide derivatives, for instance guar, cellulose derivatives and starch derivatives. The cationic polysaccharide can be obtained by chemically modifying polysaccharides, generally natural polysaccharides. By such modification, cationic groups (substituents) can be introduced into the polysaccharide backbone. Suitable cationic substituents include primary, secondary or tertiary amino groups or quaternary ammonium, sulfonium or phosphinium groups. In one embodiment, the cationic substituents are quaternary ammonium groups.

The cationic polysaccharides of the present invention include but are not limited to:

cationic guar and derivatives thereof, cationic cellulose and derivatives thereof, cationic starch and derivatives thereof, cationic callose and derivatives thereof, cationic xylan and derivatives thereof, cationic mannan and derivatives thereof.

Cationic celluloses suitable for the present invention include cellulose ethers comprising quaternary ammonium groups, cationic cellulose copolymers or celluloses grafted with a water-soluble quaternary ammonium monomer.

The cellulose ethers comprising quaternary ammonium groups are described in French patent 1,492,597 and in particular include the polymers sold under the names "JR" (JR 400, JR 125, JR 30M) or "LR" (LR 400, LR 30M) by the company Dow. These polymers are also defined in the CTFA dictionary as hydroxyethylcellulose quaternary ammoniums that have reacted with an epoxide substituted with a trimethylammonium group.

The cationic cellulose copolymers or the celluloses grafted with a water-soluble quaternary ammonium monomer are described especially in U.S. Pat. No. 4,131,576, such as hydroxyalkylcelluloses, for instance hydroxymethyl-, hydroxyethyl- or hydroxypropylcelluloses grafted especially with a methacryloyl-ethyltrimethylammonium, methacrylamidopropyltrimethylammonium or dimethyl-diallylammonium salt. The commercial products corresponding to this definition are more particularly the products sold under the names Celquat® L 200 and Celquat® H 100 by the company Akzo Nobel.

Cationic starches suitable for the present invention include the products sold under Polygelo® (cationic starches from Sigma), the products sold under Softgel®, Amylofax® and Solvitose® (cationic starches from Avebe).

In some aspects, the cationic polysaccharide is a cationic guar. Guars are polysaccharides composed of the sugars galactose and mannose. The backbone is a linear chain of β 1,4-linked mannose residues to which galactose residues are 1,6-linked at every second mannose, forming short side-branches. Within the context of the present invention, the cationic guars are cationic derivatives of guars.

In the case of the cationic polysaccharide, such as the cationic guar, the cationic group may be a quaternary ammonium group bearing 3 radicals, which may be identical or different, preferably chosen from hydrogen, alkyl, hydroxyalkyl, epoxyalkyl, alkenyl, or aryl, preferably containing 1 to 22 carbon atoms, more particularly 1 to 14 and advantageously 1 to 3 carbon atoms. The counterion is generally a halogen. One example of the halogen is chlorine.

Examples of the quaternary ammonium group include:

3-chloro-2-hydroxypropyl trimethyl ammonium chloride (CHPTMAC), 2,3-epoxypropyl trimethyl ammonium chloride (EPTAC), diallyldimethyl ammonium chloride (DMDAAC), vinylbenzene trimethyl ammonium chloride, trimethylammonium ethyl metacrylate chloride, methacrylamidopropyltrimethyl ammonium chloride (MAPTAC), and tetraalkylammonium chloride.

One example of the cationic functional group in the cationic polysaccharides, such as the cationic guars, is trimethylamino(2-hydroxyl)propyl, with a counter ion. Various counter ions can be utilized, including but not limited to halides, such as chloride, fluoride, bromide, and iodide, sulfate, notrate, methylsulfate, and mixtures thereof.

The cationic guars of the present invention may be chosen from the group consisting of:

cationic hydroxyalkyl guars, such as cationic hydroxyethyl guar, cationic hydroxypropyl guar, cationic hydroxybutyl guar, and cationic carboxylalkyl guars including cationic carboxymethyl guar, cationic alkylcarboxy guars such as cationic carboxylpropyl guar and cationic carboxybutyl guar, cationic carboxymethylhydroxypropyl guar.

In one exemplary embodiment, the cationic guar of the present invention is guar hydroxypropyltrimonium chloride or hydroxypropyl guar hydroxypropyltrimonium chloride.

The cationic polysaccharide, such as the cationic guars, of the present invention may have an average Molecular Weight (Mw) of between 100,000 Daltons and 3,500,000 Daltons, preferably between 100,000 Daltons and 1,500,000 Daltons, more preferably between 100,000 Daltons and 1,000,000 Daltons.

In the context of the present application, the term "Degree of Substitution (DS)" of cationic polysaccharides, such as cationic guars, is the average number of hydroxyl groups substituted per sugar unit. DS may be determined by titration.

The DS of the cationic polysaccharide, such as the cationic guar, may be in the range of 0.01 to 1. Preferably, the DS of the cationic polysaccharide, such as the cationic guar, is in the range of 0.05 to 1. More preferably, the DS of the cationic polysaccharide, such as the cationic guar, is in the range of 0.05 to 0.2.

In the context of the present application, "Charge Density (CD)" of cationic polysaccharides, such as cationic guars, means the ratio of the number of positive charges on a monomeric unit of which a polymer is comprised to the molecular weight of said monomeric unit.

The CD of the cationic polysaccharide, such as the cationic guar, may be in the range of 0.1 to 3 (meq/gm). Preferably, the CD of the cationic polysaccharide, such as the cationic guar, is in the range of 0.1 to 2 (meq/gm). More preferably, the CD of the cationic polysaccharide, such as the cationic guar, is in the range of 0.1 to 1 (meq/gm).

B: Nonionic Polysaccharide

The nonionic polysaccharide may be a modified nonionic polysaccharide or a non-modified nonionic polysaccharide.

The modified nonionic polysaccharide may comprise hydroxyalkylation and/or esterification. In the context of the present application, the level of modification of non-ionic polysaccharides can be characterized by Molar Substitution (MS), which means the average number of moles of substituents, such as hydroxypropyl groups, per mole of the monosaccharide unit. MS can be determined by the Zeisel-GC method, notably based on the following literature reference: K. L. Hodges, W. E. Kester, D. L. Wiederrich, and J. A. Grover, "Determination of Alkoxyl Substitution in Cellulose Ethers by Zeisel-Gas Chromatography", Analytical Chemistry, Vol. 51, No. 13, November 1979.

The MS of the modified nonionic polysaccharide may be in the range of 0 to 3. Preferably, the MS of the modified nonionic polysaccharide is in the range of 0.1 to 3. More preferably, the MS of the modified nonionic polysaccharide is in the range of 0.1 to 2.

The nonionic polysaccharide of the present invention may be especially chosen from glucans, modified or non-modified starches (such as those derived, for example, from cereals, for instance wheat, corn or rice, from vegetables, for instance yellow pea, and tubers, for instance potato or cassava), amylose, amylopectin, glycogen, dextrans, celluloses and derivatives thereof (methylcelluloses, hydroxyalkylcelluloses, ethylhydroxyethylcelluloses), mannans, xylans, lignins, arabans, galactans, galacturonans, chitin, chitosans, glucuronoxylans, arabinoxylans, xyloglucans, glucomannans, pectic acids and pectins, arabinogalactans, carrageenans, agars, gum arabics, gum tragacanths, ghatti gums, karaya gums, carob gums, galactomannans such as guars and nonionic derivatives thereof (hydroxypropyl guar), and mixtures thereof.

Among the celluloses that are especially used are hydroxyethylcelluloses and hydroxypropylcelluloses. Mention may be made of the products sold under the names Klucel® EF, Klucel® H, Klucel® LHF, Klucel® MF and Klucel® G by the company Aqualon, and Cellosize® Polymer PCG-10 by the company Amerchol.

In some aspects, the nonionic polysaccharide is a nonionic guar. The nonionic guar may be modified or non-modified. The non-modified nonionic guars include the products sold under the name Vidogum® GH 175 by the company Unipectine and under the names Meypro®-Guar 50 and Jaguar® C by the company Solvay. The modified nonionic guars are especially modified with $C_1$-$C_6$ hydroxyalkyl groups. Among the hydroxyalkyl groups that may be mentioned, for example, are hydroxymethyl, hydroxyethyl, hydroxypropyl and hydroxybutyl groups. These guars are well known in the prior art and can be prepared, for example, by reacting the corresponding alkene oxides such as, for example, propylene oxides, with the guar so as to obtain a guar modified with hydroxypropyl groups.

The nonionic polysaccharide, such as the nonionic guar, of the present invention may have an average molecular weight (Mw) of between 100,000 Daltons and 3,500,000 Daltons, preferably between 500,000 Daltons and 3,500,000 Daltons.

C: Amphoteric Polysaccharide

Suitable amphoteric polysaccharide may be a polysaccharide derivative containing both a cationic and an anionic substituent. The polysaccharide backbone may be any of the native or natural polysaccharide polymers obtained from plant, animal and microbial sources, for instance guar, cellulose, starch and the derivatives thereof.

The amphoteric polysaccharides are derivatized or modified to contain a cationic group or substituent. The substituted polysaccharides are formed by the derivatization of the hydroxyl functionality of the polysaccharide. The cationic group may be an amino, ammonium, imino, sulfonium or phosphonium group. Such cationic derivatives include those containing nitrogen containing groups comprising primary, secondary, tertiary and quaternary amines and sulfonium and phosphonium groups attached through either ether or ester linkages. The preferred cationic derivatives are those containing the tertiary amino and quaternary ammonium ether groups.

The cationic derivatives as described herein may be produced by known methods as disclosed for example in "Cationic Starches", by D. B. Solarek in Modified Starches: Properties and Uses, Chapter 8, 1986 and in U.S. Pat. No. 4,119,487 issued Oct. 10, 1978 to M. Tessler. The method for preparing polysaccharides such as starch or guar containing tertiary amino groups involves reacting the polysaccharide under alkaline conditions with a dialkylaminoalkyl halide as described in U.S. Pat. No. 2,813,093 issued on Nov. 12, 1957 to C. Caldwell et al. The primary and secondary amine derivatives may be prepared by reacting the polysaccharide with aminoalkyl anhydrides, amino epoxides or halides, or the corresponding compounds containing aryl in addition to the alkyl groups.

Quaternary ammonium groups may be introduced into the polysaccharide backbone (such as a guar backbone) by treatment with the reaction product of an epihalohydrin and a tertiary amine or tertiary amine salt to provide, for example, 2-hydroxypropyl ether substituent groups as disclosed in the noted U.S. Pat. No. 4,119,487. They may also be introduced into the guar backbone by suitable treatment of guar with etherifying agents known in the art.

Particularly useful cationic derivatives are those containing amino or nitrogen groups having alkyl, aryl, alkaryl, or cyclic substituents of 1 to 22 carbon atoms and especially alkyl of 1 to 6 carbon atoms.

The polysaccharide used in this invention will also be derivatized with an anionic group or substituent. This anionic group may be a carboxyl, sulfonate, sulfate, phosphate or phosphonate group, preferably a carboxyl group. The introduction of these groups may be achieved by various known methods.

The carboxyl group may be introduced into the polysaccharide by reacting the water-dispersible polysaccharide in the presence of an alkaline catalyst and a mono halogen substituted acid such as monochloro acetic acid, acrylic acid, acrylamide followed by hydrolysis of the amide group and acrylonitrile followed by hydrolysis of the cyanoethyl groups. Carboxyl groups may also be provided by oxidation such as reaction with sodium periodate followed by treatment with sodium chlorite to transform the carbonyl groups to carboxyl groups.

Sulfonate groups can be introduced by reaction with reagents containing functional groups such as sultones, sodium salt of halo alkane sulfonic acids, chloropropane sulfonic acid, epoxypropane sulfonic acid and ethene sulfonic acid. Sulfonate groups may also be introduced by oxidation such as by reaction with sodium periodate followed by treatment with potassium bisulphite. Sulfate groups can be introduced e.g., with addition products of sulfur trioxide and a tertiary amine, or treatment with sulfamic acid and/or sulfuric acid and urea.

Phosphate groups can be added to the polysaccharide by known techniques such as phosphorylation with alkali metal phosphate salts.

The preferred amphoteric derivatives are those containing carboxyl groups as the anionic substituent and more particularly those containing carboxyalkyl groups having from 2 to 6 carbon atoms. The carboxyalkyl ether derivatives are particularly useful and they may be obtained by the reaction of the polysaccharide such as guar with a halo alkyl acid containing 2 to 6 carbon atoms or the alkali metal salt thereof. The reaction is carried out using an aqueous alcohol slurry with an alkali metal hydroxide catalyst such as sodium hydroxide. Acids and salts that can be used include monochloroacetic acid and sodium chloroacetate.

The introduction of the anionic and cationic substituents may be carried out either sequentially or simultaneously and the method chosen may depend on the particular reactants, the amount of substituents desired and the method used.

Certain quaternary ammonium compounds have relatively low melting point, for example, the melting point may be lower than 35° C., or even be lower than 25° C. In such case, a higher amount of polysaccharide needs to be added to the composition in order to make the composition stable solid. On the other hand, adding too much polysaccharide in the composition may make the composition difficult for processing, for example, difficult to form a homogeneous mixture. According to the present invention, the solid composition preferably comprises between 9 wt % and 77 wt % of the polysaccharide based on the total weight of the solid composition, more preferably, the solid composition comprises between 16 wt % and 67 wt % of the polysaccharide based on the total weight of the solid composition, even more preferably, the solid composition comprises between 25 wt % and 50 wt % of the polysaccharide based on the total weight of the solid composition. It has been found that the solid composition according to the present invention can remain homogenous and stable solid at the ambient temperature. Furthermore, the solid composition can remain homogenous when being exposed to a temperature up to 45° C.

In some aspects, the weight ratio of the quaternary ammonium compound and the polysaccharide comprised in the solid composition is in the range of 10:1 to 1:3. Preferably, the weight ratio of the quaternary ammonium compound and the polysaccharide comprised in the solid composition is in the range of 5:1 to 1:2. More preferably, the weight ratio of the quaternary ammonium compound and the polysaccharide comprised in the solid composition is in the range of 3:1 to 1:1.

The solid composition of the present invention may comprise more than one polysaccharides. The more than one polysaccharides comprised in the solid composition can be selected from cationic polysaccharides, nonionic polysaccharides, ampholytic polysaccharides or combination thereof. In some aspects, the solid composition comprises a cationic polysaccharide and a nonionic polysaccharide. Notably, the solid composition comprises a cationic guar and a nonionic guar.

In aspects wherein the solid composition comprises more than one polysaccharides, the solid composition preferably comprises between 9 wt % and 77 wt % of the total polysaccharides based on the total weight of the solid composition, more preferably, the solid composition comprises between 16 wt % and 67 wt % of the total polysaccharides based on the total weight of the solid composition, even more preferably, the solid composition comprises between 25 wt % and 50 wt % of the total polysaccharides based on the total weight of the solid composition. The ratio of the weight of the quaternary ammonium compound and the total weight of the polysaccharides may be in the range of 10:1 to 1:3. Preferably, the ratio of the weight of the quaternary ammonium compound and the total weight of the polysaccharides is in the range of 5:1 to 1:2. More preferably, the ratio of the weight of the quaternary ammonium compound and the total weight of the polysaccharides is in the range of 3:1 to 1:1.

Optional Components

The solid composition of the present invention may also comprise optional components, preferably, selected from those that are not sensitive to heating and shearing. In the event that the optional components are sensitive to heating or shearing, such components are preferably added to a liquid composition prepared by using the solid composition of the present invention as described hereafter. The optional components include and are not limited to those described below.

The solid composition may comprise a silicone compound. The silicone compound of the invention can be a linear or branched structured silicone polymer. The silicone of the present invention can be a single polymer or a mixture of polymers. Suitable silicone compounds include polyalkyl silicone, amonosilicone, siloxane, polydimethyl siloxane, ethoxylated organosilicone, propoxylated organosilicone, ethoxylated/propoxylated organosilicone and mixture thereof. Suitable silicones include but are not limited to those available from Wacker Chemical, such as Wacker® FC 201 and Wacker® FC 205.

The solid composition may comprise a cross-linking agent. Following is a non-restrictive list of cross-linking agents: methylene bisacrylamide (MBA), ethylene glycol diacrylate, polyethylene glycol dimethacrylate, diacrylamide, triallylamine, cyanomethylacrylate, vinyl oxyethylacrylate or methacrylate and formaldehyde, glyoxal, compounds of the glycidyl ether type such as ethyleneglycol diglycidyl ether, or the epoxydes or any other means familiar to the expert permitting cross-linking.

The solid composition may comprise at least one surfactant system. A variety of surfactants can be used in the solid composition of the invention, including cationic, nonionic and/or amphoteric surfactants, which are commercially available from a number of sources. For a discussion of surfactants, see Kirk-Othmer, Encyclopedia of Chemical Technology, Third Edition, volume 8, pages 900-912. Preferably, the solid composition comprises a surfactant system in an amount effective to provide a desired level of softness to fabrics while still maintaining a solid form, preferably between about 5 and about 10 wt %.

The solid composition may comprise a dye, such as an acid dye, a hydrophobic dye, a basic dye, a reactive dye, a dye conjugate. Suitable acid dyes include azine dyes such as acid blue 98, acid violet 50, and acid blue 59, non-azine acid dyes such as acid violet 17, acid black 1 and acid blue 29. Hydrophobic dyes selected from benzodifuranes, methine, triphenylmethanes, napthalimides, pyrazole, napthoquinone, anthraquinone and mono-azo or di-azo dye chromophores. Suitable hydrophobic dyes are those dyes which do not contain any charged water solubilising group. The hydrophobic dyes may be selected from the groups of disperse and solvent dyes. Blue and violet anthraquinone and mono-azo dye are preferred. Basic dyes are organic dyes which carry a net positive charge. They deposit onto cotton. They are of particular utility for used in composition that contain predominantly cationic surfactants. Dyes may be selected from the basic violet and basic blue dyes listed in the Colour Index International. Preferred examples include triarylmethane basic dyes, methane basic dye, anthraquinone basic dyes, basic blue 16, basic blue 65, basic blue 66, basic blue 67, basic blue 71, basic blue 159, basic violet 19, basic violet 35, basic violet 38, basic violet 48; basic blue 3, basic blue 75, basic blue 95, basic blue 122, basic blue 124, basic blue 141. Reactive dyes are dyes which contain an organic group capable of reacting with cellulose and linking the dye to cellulose with a covalent bond. Preferably the reactive group is hydrolysed or reactive group of the dyes has been reacted with an organic species such as a polymer, so as to the link the dye to this species. Dyes may be selected from the reactive violet and reactive blue dyes listed in the Colour Index International. Preferred examples include reactive blue 19, reactive blue 163, reactive blue 182 and reactive blue, reactive blue 96. Dye conjugates are formed by binding direct, acid or basic dyes to polymers or particles via physical forces. Dependent on the choice of polymer or particle they deposit on cotton or synthetics. A description is given in WO2006/055787. Particularly preferred dyes are: direct violet 7, direct violet 9, direct violet 11, direct violet 26, direct violet 31, direct violet 35, direct violet 40, direct violet 41, direct violet 51, direct violet 99, acid blue 98, acid violet 50, acid blue 59, acid violet 17, acid black 1, acid blue 29, solvent violet 13, disperse violet 27 disperse violet 26, disperse violet 28, disperse violet 63, disperse violet 77 and mixtures thereof.

Useful components of the perfume include materials of both natural and synthetic origin. They include single compounds and mixtures. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of perfuming, flavouring, and/or aromatizing consumer products, i.e., of imparting an odour and/or a flavour or taste to a consumer product traditionally perfumed or flavoured, or of modifying the odour and/or taste of said consumer product.

By perfume in this context is not only meant a fully formulated product fragrance, but also selected components of that fragrance, particularly those which are prone to loss, such as the so-called 'top notes'. Top notes are defined by Poucher (Journal of the Society of Cosmetic Chemists 6(2):80 [1955]). Examples of well known top-notes include citrus oils, linalool, linalyl acetate, lavender, dihydromyrcenol, rose oxide and cis-3-hexanol.

Some or all of the perfume or pro-fragrance may be encapsulated, typical perfume components which it is advantageous to encapsulate, include those with a relatively low boiling point. It is also advantageous to encapsulate perfume components which have a low Clog P (i.e. those which will be partitioned into water), preferably with a Clog P of less than 3.0. As used herein, the term "Clog P" means the calculated logarithm to base 10 of the octanol/water partition coefficient (P). These materials, of relatively low boiling point and relatively low Clog P have been called the "delayed blooming" perfume ingredients and include the following materials:

Allyl Caproate, Amyl Acetate, Amyl Propionate, Anisic Aldehyde, Anisole, Benzaldehyde, Benzyl Acetate, Benzyl Acetone, Benzyl Alcohol, Benzyl Formate, Benzyl Iso Valerate, Benzyl Propionate, Beta Gamma Hexenol, Camphor Gum, Laevo-Carvone, d-Carvone, Cinnamic Alcohol, Cinamyl Formate, Cis-Jasmone, cis-3-Hexenyl Acetate, Cuminic Alcohol, Cyclal C, Dimethyl Benzyl Carbinol, Dimethyl Benzyl Carbinol Acetate, Ethyl Acetate, Ethyl Aceto Acetate, Ethyl Amyl Ketone, Ethyl Benzoate, Ethyl Butyrate, Ethyl Hexyl Ketone, Ethyl Phenyl Acetate, Eucalyptol, Eugenol, Fenchyl Acetate, Flor Acetate (tricyclo Decenyl Acetate), Frutene (tricycico Decenyl Propionate), Geraniol, Hexenol, Hexenyl Acetate, Hexyl Acetate, Hexyl Formate, Hydratropic Alcohol, Hydroxycitronellal, Indone, Isoamyl Alcohol, Iso Menthone, Isopulegyl Acetate, Isoquinolone, Ligustral, Linalool, Linalool Oxide, Linalyl Formate, Menthone, Menthyl Acetphenone, Methyl Amyl Ketone, Methyl Anthranilate, Methyl Benzoate, Methyl Benzyl Acetate, Methyl Eugenol, Methyl Heptenone, Methyl Heptine Carbonate, Methyl Heptyl Ketone, Methyl Hexyl Ketone, Methyl Phenyl Carbinyl Acetate, Methyl Salicylate, Methyl-N-Methyl Anthranilate, Nerol, Octalactone, Octyl Alcohol, p-Cresol, p-Cresol Methyl Ether, p-Methoxy Acetophenone, p-Methyl Acetophenone, Phenoxy Ethanol, Phenyl Acetaldehyde, Phenyl Ethyl Acetate, Phenyl Ethyl Alcohol, Phenyl Ethyl Dimethyl Carbinol, Prenyl Acetate, Propyl Bornate, Pulegone, Rose Oxide, Safrole, 4-Terpinenol, Alpha-Terpinenol, and/or Viridine. Preferred non-encapsulated perfume ingredients are those hydrophobic perfume components with a Clog P above 3. Perfume components with a Clog P above 3 comprise: Iso E super, citronellol, Ethyl cinnamate, Bangalol, 2,4,6-Trimethylbenzaldehyde, Hexyl cinnamic aldehyde, 2,6-Dimethyl-2-heptanol, Diisobutylcarbinol, Ethyl salicylate, Phenethyl isobutyrate, Ethyl hexyl ketone, Propyl amyl ketone, Dibutyl ketone, Heptyl methyl ketone, 4,5-Dihydrotoluene, Caprylic aldehyde, Citral, Geranial, Isopropyl benzoate, Cyclohexanepropionic acid, Campholene aldehyde, Caprylic acid, Caprylic alcohol, Cuminaldehyde, 1-Ethyl-4-nitrobenzene, Heptyl formate, 4-lsopropylphenol, 2-lsopropylphenol, 3-lsopropylphenol, Allyl disulfide, 4-Methyl-1-phenyl-2-pentanone, 2-Propylfuran, Allyl caproate, Styrene, Isoeugenyl methyl ether, Indonaphthene, Diethyl suberate, L-Menthone, Menthone racemic, p-Cresyl isobutyrate, Butyl butyrate, Ethyl hexanoate, Propyl valerate, n-Pentyl propanoate, Hexyl acetate, Methyl heptanoate, trans-3,3,5-Trimethylcyclohexanol, 3,3,5-Trimethylcyclohexanol, Ethyl p-anisate, 2-Ethyl-1-hexanol, Benzyl isobutyrate, 2,5-Dimethylthiophene, Isobutyl 2-butenoate, Caprylnitrile, gamma-Nonalactone, Nerol, trans-Geraniol, 1-Vinylheptanol, Eucalyptol, 4-Terpinenol, Dihydrocarveol, Ethyl 2-methoxybenzoate, Ethyl cyclohexanecarboxylate, 2-Ethylhexanal, Ethyl amyl carbinol, 2-Octanol, 2-Octanol, Ethyl methylphenylglycidate, Diisobutyl ketone, Coumarone, Propyl isovalerate, Isobutyl butanoate, Isopentyl propanoate, 2-Ethylbutyl acetate, 6-Methyl-tetrahydroquinoline, Eugenyl methyl ether, Ethyl dihydrocinnamate, 3,5-Dimethoxytoluene, Toluene, Ethyl benzoate, n-Butyrophenone, alpha-Terpineol, Methyl 2-methylbenzoate, Methyl 4-methylbenzoate, Methyl 3, methylbenzoate, sec. Butyl n-butyrate, 1,4-Cineole, Fenchyl alcohol, Pinanol, cis-2-Pinanol, 2,4, Dimethylacetophenone, Isoeugenol, Safrole, Methyl 2-octynoate, o-Methylanisole, p-Cresyl methyl ether, Ethyl anthranilate, Linalool, Phenyl butyrate, Ethylene glycol dibutyrate, Diethyl phthalate, Phenyl mercaptan, Cumic alcohol, m-Toluquinoline, 6-Methylquinoline, Lepidine, 2-Ethylbenzaldehyde, 4-Ethylbenzaldehyde, o-Ethylphenol, p-Ethylphenol, m-Ethylphenol, (+)-Pulegone, 2,4-Dimethylbenzaldehyde, Isoxylaldehyde, Ethyl sorbate, Benzyl propionate, 1,3-Dimethylbutyl acetate, Isobutyl isobutanoate, 2,6-Xylenol, 2,4-Xylenol, 2,5-Xylenol, 3,5-Xylenol, Methyl cinnamate, Hexyl methyl ether, Benzyl ethyl ether, Methyl salicylate, Butyl propyl ketone, Ethyl amyl ketone, Hexyl methyl ketone, 2,3-Xylenol, 3,4, Xylenol, Cyclopentadenanolide and Phenyl ethyl 2 phenylacetate 2. It is commonplace for a plurality of perfume components to be present in a formulation. Another group of perfumes with which the present invention can be applied are the so-called 'aromatherapy' materials. These include many components also used in perfumery, including components of essential oils such as Clary Sage, Eucalyptus, Geranium, Lavender, Mace Extract, Neroli, Nutmeg, Spearmint, Sweet Violet Leaf and Valerian.

The solid composition may comprise an antimicrobial. The antimicrobial may be a halogenated material. Suitable halogenated materials include 5-chloro-2-(2,4-dichlorophenoxy)phenol, o-Benzyl-p-chloro-phenol, and 4-chloro-3-methylphenol. Alternatively The antimicrobial may be a non-halogenated material. Suitable non-halogenated materials include 2-Phenylphenol and 2-(1-Hydroxy-1-methylethyl)-5-methylcyclohexanol. Phenyl ethers are one preferred sub-set of the antimicrobials. The antimicrobial may also be a bi-halogenated compound. Most preferably this comprises 4-4' dichloro-2-hydroxy diphenyl ether, and/or 2,2-dibromo-3-nitrilopropionamide (DBNPA).

The solid composition of the present invention may also comprise preservatives. Preferably only those preservatives that have no, or only slight, skin sensitizing potential are used. Examples are phenoxy ethanol, 3-iodo-2-propynylbutyl carbamate, sodium N-(hydroxymethyl)glycinate, biphenyl-2-ol as well as mixtures thereof.

The solid composition may also comprise antioxidants to prevent undesirable changes caused by oxygen and other oxidative processes to the solid composition and/or to the treated textile fabrics. This class of compounds includes, for example, substituted phenols, hydroquinones, pyrocatechols, aromatic amines and vitamin E.

The solid composition may also comprise one or more of the following optional components: dispersing agents, stabilizers, colorants, brighteners, dyes, odor control agent, cyclodextrins, soil release polymers, chlorine scavengers, anti-shrinkage agents, fabric crisping agents, spotting agents, anti-corrosion agents, bodying agents, drape and form control agents, smoothness agents, static control agents, wrinkle control agents, sanitization agents, disinfecting agents, germ control agents, mold control agents, mildew control agents, antiviral agents, drying agents, stain resistance agents, malodor control agents, fabric refreshing agents, chlorine bleach odor control agents, dye fixatives, dye transfer inhibitors, color maintenance agents, color restoration/rejuvenation agents, anti-fading agents, whiteness enhancers, anti-abrasion agents, wear resistance agents, fabric integrity agents, anti-wear agents, defoamers and anti-foaming agents, rinse aids, UV protection agents, sun fade inhibitors, insect repellents, anti-allergenic agents, enzymes, flame retardants, water proofing agents, fabric comfort agents, shrinkage resistance agents, stretch resistance agents, and mixtures thereof.

Preferably, the solid composition of the present invention does not comprise any carrier material. "Carrier material" means a material, generally in a particulate form, which is used for carrying the active ingredient, wherein the active ingredient is substantially coated on the surface of the carrier material. One example of the carrier material is an inorganic salt particle. Notably, the solid composition of the present invention does not comprise any inorganic salt particle. One advantage of not including any carrier material in the solid composition is that the solid composition may comprise a higher percentage of active ingredients, such as the quaternary ammonium compound and the polysaccharide. Another advantage is that the solid composition of the present invention is easier to prepare compared to those which requires a carrier material.

In another aspect of the present invention, there is provided a process for preparing a solid composition comprising the steps of:

(i) providing a quaternary ammonium compound in liquid form;

(ii) combining a polysaccharide with the quaternary ammonium compound to obtain a mixture;

(iii) solidifying the mixture;

wherein the solid composition comprises between 9 wt % and 77 wt % of the polysaccharide based on the total weight of the solid composition.

Notably, there is provided a process comprises the steps of:

(i) providing a quaternary ammonium compound in liquid form;

(ii) combining a polysaccharide with the quaternary ammonium compound to obtain a mixture;

(iii) solidifying the mixture;

wherein the solid composition comprises (a) 50 wt % or above of a quaternary ammonium compound; and (b) between 9 wt % and 50 wt % of the polysaccharide; weight percentages are based on the total weight of the solid composition. In particular, the solid composition comprises (a) between 50 wt % and 91 wt % of the quaternary ammonium compound and (b) between 9 wt % and 50 wt % of the polysaccharide; weight percentages are based on the total weight of the solid composition.

The quaternary ammonium compound and the polysaccharide in the above process may be selected from those described herein.

In still another aspect of the present invention, there is provided a solid composition obtained by the process described herein.

The process for preparing the solid composition comprises in step (i) providing a quaternary ammonium compound in liquid form. Preferably, the quaternary ammonium compound is substantially free or completely free of water.

The quaternary ammonium compound may be molten by heating to a temperature above their melting point to obtain the quaternary ammonium compound in liquid form. The heating temperature may be in the range of 25° C. to 80° C., preferably in the range of 35° C. to 70° C. Preferably, the quaternary ammonium compound is heated with agitation. Some quaternary ammonium compounds are in liquid phase at the ambient temperature. In such case, the quaternary ammonium compounds may be directly employed for the process of the present invention, alternatively, the quaternary ammonium compounds may be heated to increase the viscosity so that the quaternary ammonium compounds become easier to be mixed with other components.

The process according to the present invention comprises in step (ii) combining a polysaccharide and the quaternary ammonium compound to obtain a mixture. In one embodiment, the polysaccharide may be added to the quaternary ammonium compound when the quaternary ammonium compound is partially or completely molten. In another embodiment, the polysaccharide may be mixed with the quaternary ammonium compound and then subject to heating. To facilitate mixing of the quaternary ammonium compound and the polysaccharide, the mixing may be done while heating. Preferably, the mixing is done with heating and agitation. The agitation may be provided by stirring the mixture at 500 to 1000 rpm by using a suitable stirring device. The mixing may be stopped when the quaternary ammonium compound and the polysaccharide are completely mixed and form a homogenous mixture. Generally, 10 to 30 mins are sufficient for complete mixing of the quaternary ammonium compound and the polysaccharide.

It is appreciated that the optional components described hereabove may also be mixed with the quaternary ammonium compound and the polysaccharide, as the case may be. These components may be mixed in any desired order.

Preferably, no water is added into the mixture during the process, and therefore, the mixture and the resulting solid composition is substantially free or completely free of water.

The mixing may be done in any suitable mixer, including but not limited to an open top stand mixer which is preferably used during bench-scale laboratory experiments. During scale-up for commercial purposes, a blender including, but not limited to, a vented, closed system blender is preferably used.

Preferably, a homogenization step may be provided after the mixing of the quaternary ammonium compound and the at least one polysaccharide so as to obtain a more stable and homogenous mixture. The homogenization step may employ a homogenization device commonly known in the art. The homogenization may be conducted at a speed of 3000 to 10000 rpm and the time for the homogenization may be 2 to 10 mins.

The process according to the present invention comprises in step (iii) solidifying the mixture.

The mixture obtained in step (ii) may be solidified, preferably by cooling the mixture below a temperature at which the mixture is solid. For example, the mixture may be cooled to the ambient temperature so as to obtain the solid composition of the present invention.

Optionally, the solid composition may be subject to breaking or milling so as to obtain flakes, granules, powder and the like. The solid composition may also be compressed into tablets. The solid composition may also be encapsulated. It is appreciated that the solid composition may be in any desired size or shape.

The solid composition according to the present application may be used for various home care and personal care applications, in particular, for fabric conditioning. Alternatively, the solid composition can serve as a premix which may be used by industrial users for preparing aqueous compositions for home care and personal care applications.

In one embodiment, the solid composition may be used for conditioning a fabric in a dryer which is used for the removal of water. The dryer in which the solid composition of the present invention can be used include any type of dryer that uses heat and/or agitation and/or air flow to remove water from the fabric. An exemplary dryer includes a tumble-type dryer where the fabric is provided within a rotating drum that causes the fabric to tumble during the operation of the dryer. Tumble-type dryers are commonly found in industrial and institutional sector laundry operations. By the term, "industrial and institutional" it is meant that the operations are located in the service industry including but not limited to hotels, motels, restaurants, health clubs, healthcare, and the like. The solid composition may be provided for releasing an effective amount of the solid composition to the fabric during a drying cycle in the dryer to impart the desired benefits to the fabric, such as softness. The solid composition may be placed inside the dryer, for example, the solid composition may be placed on an interior wall of the dryer or be placed freely in the dryer, so that the solid composition contacts the fabric that is being dried. When being used in the dryer, the solid composition is preferably in the shape of a block, a pellet, a sheet or a ball.

In another embodiment, the solid composition may serve as a premix which may be used, preferably by industrial users, for preparing aqueous compositions for home care and personal care applications.

Accordingly, in one aspect of the present invention, there is provided a process for preparing a liquid composition comprising the step of mixing the solid composition described herein with a solvent, such as water, organic solvents and mixture thereof. In another aspect of the present invention, there is provided a process for preparing a liquid composition comprising the step of mixing the solid composition obtained by the process described herein with a solvent, such as water, organic solvents and mixture thereof. The mixing may be done by adding the solid composition to the solvent already present in a recipient, such as a tank, and optionally with stirring. The mixing may be done at 10 to 70° C., preferably from 30 to 60° C. The liquid composition may be in the form of a solution, a suspension, a dispersion, an emulsion, a foam, a gel, a slurry or the like. For better dispersability, a preferred form of the liquid composition is in the form of an aqueous dispersion in water. The dosage of the solid composition used for preparing the liquid composition can be determined according to the needs. In one preferred embodiment, the liquid composition is an aqueous fabric conditioning composition.

It is appreciated that the optional components described hereabove can either be added during the process of preparing the solid composition or be added at the stage of preparing the liquid composition.

Depending on the needs, at the time of preparing the liquid composition, additional amount of the quaternary ammonium compound and/or the polysaccharide may be added to the liquid composition on top of the solid composition of the present invention.

In one aspect, the present invention also provides a liquid composition obtained by the process described herein.

In another aspect, the present invention concerns a method of conditioning a fabric comprising the step of contacting the fabric with the liquid composition as described herein. Typically the liquid composition may be added during a rinse cycle of an automatic laundry machine or during manual wash. One aspect of the invention provides dosing the liquid composition of the present invention during the rinse cycle of the automatic laundry machine or during the manual wash. Another aspect of the invention provides for a kit comprising the liquid composition of the present invention and optionally instructions for use. When being used in the rinse process, the liquid composition is first diluted in an aqueous rinse bath solution. Subsequently, the laundered fabrics which have been washed with a detergent liquor and optionally rinsed in a first inefficient rinse step ("inefficient" in the sense that residual detergent and/or soil may be carried over with the fabrics), are placed in the rinse solution with the diluted composition. Of course, the liquid composition may also be incorporated into the aqueous bath once the fabrics have been immersed therein. Following that step, agitation is applied to the fabrics in the rinse bath solution causing the suds to collapse, and residual soils and surfactant is to be removed. The fabrics can then be optionally wrung before drying.

Some of the advantages of the present invention are as below:

(1) the solid composition of the present invention is easy for transportation and storage, thus, it is more convenient and economical for users, especially for industrial users.

(2) the solid composition is stable and homogenous at temperatures up to 45° C. Thus, the solid composition can have higher resistance against high temperature environment and can have prolonged shelf life. Liquid systems containing the quaternary ammonium compound and the polysaccharide are usually not stable and have the problem of phase separation. In contrast, the solid composition according to the present invention can remain stable solid and homogenous under the ambient temperature. One challenge of the present invention is that the solid composition may be used or stored in high temperature environment, for example, the solid composition may be stored or used in tropical zones. If the solid composition is susceptible to melting when being exposed to the high temperature environment, the quaternary ammonium compound and the polysaccharide may separate and the composition may no longer be homogenous. It has been found that the solid composition of the present invention has excellent stability and can remain homogenous at temperature up to 45° C., which is a surprising effect.

(3) the solid composition comprise high percentages of the quaternary ammonium compound and the polysaccharide, which provide more freedom for users, particularly for industrial users, to blend the solid composition with solvents or other components to achieve the desired concentration of the components in the final formulation.

Should the disclosure of any patents, patent applications, and publications which are incorporated herein by reference conflict with the description of the present application to the extent that it may render a term unclear, the present description shall take precedence.

The following examples are included to illustrate embodiments of the invention. Needless to say, the invention is not limited to the described examples.

Examples

Materials:
Quat
TEP: Di(palmiticcarboxyethyl)hydroxyethyl methyl ammonium methylsulfate; Fentacare® TEP softener (from Solvay);
DEEDMAC: Diethyl Ester Dimethyl Ammonium Chloride from Evonik Industries;
Polysaccharides
Polysaccharide 1: a guar hydroxypropyltrimonium chloride having a molecular weight of approximately 2M Daltons from Solvay;
Polysaccharide 2: a guar hydroxypropyltrimonium chloride having a molecular weight below 1M Daltons from Solvay;
Polysaccharide 3: a hydroxypropyl guar hydroxypropyltrimonium chloride having a molecular weight of approximately 1.5M Daltons from Solvay;
Polysaccharide 4: a natural guar gum from Solvay;
Polysaccharide 5: a hydroxypropyl guar having a molecular weight of between 2,000,000 and 3,000,000 Daltons from Sovlay.
Polysaccharide 6: another hydroxypropyl guar having a molecular weight of between 2,000,000 and 3,000,000 Daltons from Sovlay.

Solid compositions are prepared according to the formulations under the Component Panel in Table 1. The process for preparing the compositions is as below:

(1) the quat was melt in a top open mixer at a temperature of 45 to 55° C. with stirring at a speed of 100 to 300 rpm. The heating time was 15 to 30 mins.

(2) certain amounts of polysaccharide powders were added to the molten quat, and then mixed with agitation at a speed of 500 rpm. The mixing time was 15 to 30 mins and the mixture was subject to continuous heating during the mixing.

(3) after the mixture became homogenous, the mixture was cooled down to the ambient temperature to become a solid composition.

Processibity and Stability Tests

The processibity of the solid compositions means whether the components of the solid composition are easy to be mixed and to form a homogenous mixture. For such assessment, the quat was heated to a temperature above its melting point, then the polysaccharide was added to the melt and the mixture was stirred at 500 rpm. It is observed whether the components can be well mixed and form a homogenous mixture.

The stability of the solid compositions was assessed by putting the solid composition in an oven at 45° C. Then the solid compositions were taken out of the oven every 7 days and cooled to the ambient temperature. Subsequently, the physical state and appearance of the solid compositions were observed. The samples were tested for up to 60 days.

Results were shown under the Results Panel in Table 1.

TABLE 1

|  | Sample 1 | Sample 2 | Sample 3 |
|---|---|---|---|
| Component (wt %) | | | |
| TEP | 90.9 | 50 | 75 |
| DEEDMAC | — | — | — |
| Polysaccharide 1 | 9.1 | — | — |
| Polysaccharide 2 | — | — | — |
| Polysaccharide 3 | — | 50 | — |
| Polysaccharide 4 | — | — | 25 |
| Polysaccharide 5 | — | — | — |
| Polysaccharide 6 | — | — | — |
| Total | 100 | 100 | 100 |
| Results | | | |
| Stability | >60 days | >60 days | >60 days |
| Processibity | Easy to process | Easy to process | Easy to process |

|  | Sample 4 | Sample 5 | Comparative Sample 1 | Comparative Sample 2 |
|---|---|---|---|---|
| Component (wt %) | | | | |
| TEP | — | 75 | 92 | 20 |
| DEEDMAC | 85 | — | — | — |
| Polysaccharide 1 | — | — | 8 | — |
| Polysaccharide 2 | — | 12.5 | — | — |
| Polysaccharide 3 | — | — | — | — |
| Polysaccharide 4 | — | — | — | — |
| Polysaccharide 5 | 15 | — | — | — |
| Polysaccharide 6 | — | 12.5 | — | 80 |
| Total | 100 | 100 | 100 | 100 |
| Results | | | | |
| Stability | >60 days | >60 days | <7 days | — |
| Processibity | Easy to process | Easy to process | Easy to process | Too thick to mix |

As shown in Table 1, the solid compositions of Samples 1 to 5 were easy to form homogenous mixture and exhibited excellent processibity. Also, these samples remained homogenous when being exposed to 45° C. for up to 60 days. In contrast, the solid composition of Comparative Sample 1 showed phase separation when being exposed to 45° C. for 7 days. The solid composition in Comparative Sample 2 was too thick and difficult to be mixed into a homogeneous mixture.

Softening Performance Test

The softening performance of the solid compositions was also assessed. For this test, solid compositions were prepared according to the formulations shown in Table 2 below:

TABLE 2

| Components (g) | Sample 6 | Sample 7 | Sample 8 | Comparative Sample 3 |
|---|---|---|---|---|
| TEP | 1.2 | 1.2 | 1.2 | 1.2 |
| Polysaccharide 2 | 0.2 | 0.4 | — | — |
| Polysaccharide 6 | 0.2 | — | 0.4 | — |

The solid compositions prepared were dissolved in 100 ml water. Then 2 grams of each liquid composition were diluted in 1 liter water. Then towels were immersed into the water containing different samples (2 towels for each sample), respectively, for 10 mins. Then, the treated towels were drawn out, span for 5 mins and dried overnight. Then, the softness of each treated towel was evaluated by five panellists independently in which the panellist touched the treated towel and felt the softness of the treated towel (double-blinded test). The softness of the treated towels was rated in a scale of 1 to 5, wherein 1 represents the lowest softness and 5 represents the highest softness. Subsequently, the average softness rating of the towels treated by the same sample (n=10) was calculated. The results are shown in Table 3 below:

TABLE 4

| | Sample 6 | Sample 7 | Sample 8 | Comparative Sample 3 |
|---|---|---|---|---|
| Average softness rating | 4.5 | 3.1 | 3.8 | 2.5 |

Results showed that the solid compositions of the present invention had higher softening performance on the fabrics compared to the composition comprising the quat alone. In particular, the solid composition comprising combination of cationic polysaccharide and nonionic polysaccharide exhibited the highest softening performance among the compositions tested.

The invention claimed is:

1. A solid composition comprising:
   (a) between 50 wt. % and 91 wt. % of a quaternary ammonium compound; and
   (b) between 9 wt. % and 50 wt. % of a polysaccharide based on the total weight of the solid composition;
   wherein the solid composition comprises less than 0.1 wt. % of water and the quaternary ammonium compound has the general formula (III):

$$[N^+((CH_2)_n\text{-}T\text{-}R_8)_2(R_8)(R_9)]_y X^-\qquad (III)$$

wherein:
R$_9$ group is independently selected from a C$_1$-C$_4$ alkyl or hydroxylalkyl group;
R$_8$ group is independently selected from a C$_1$-C$_{30}$ alkyl or alkenyl group;
T is C(=O)—O— or O—C(=O)—;
n is an integer from 0 to 5;
X is an anion; and
y is the valence of X.

2. The solid composition according to claim 1, wherein the solid composition does not comprise any carrier material.

3. The solid composition according to claim 1, wherein the quaternary ammonium compound has the general formula (IV):

$$N^+(C_2H_4\text{—}OOCR_{10})_2(CH_3)(C_2H_4\text{—}OH)(CH_3)_2SO_4^-\qquad (IV)$$

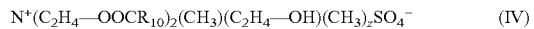

wherein R$_{10}$ is a C$_{12}$-C$_{20}$ alkyl group; and
z is 1.

4. The solid composition according to claim 1, wherein the polysaccharide is a cationic polysaccharide and a nonionic polysaccharide.

5. The solid composition according to claim 1, wherein the polysaccharide is a cationic guar and a nonionic guar.

6. The solid composition according to claim 1, wherein the polysaccharide is selected from at least one cationic polysaccharide, at least one nonionic polysaccharide, at least one ampholytic polysaccharide, or combinations thereof.

7. The solid composition according to claim 6, wherein the at least one cationic polysaccharide is at least one cationic guar.

8. The solid composition according to claim 7, wherein the at least one cationic guar is selected from guar hydroxypropyltrimonium chloride, hydroxypropyl guar hydroxypropyltrimonium chloride, and combinations thereof.

9. The solid composition according to claim 6, wherein the at least one nonionic polysaccharide is at least one nonionic guar.

10. A process for preparing a liquid composition, comprising the step of mixing the solid composition according to claim 1 with a solvent selected from water, an organic solvent, or a mixture thereof.

11. A method for conditioning a fabric, comprising the step of contacting the fabric with the solid composition according to claim 1 during a drying cycle of a dryer.

12. A process for preparing a solid composition comprising the steps of:
   (i) combining a polysaccharide with a quaternary ammonium compound in liquid form to obtain a mixture; and
   (ii) solidifying the mixture;
   wherein the solid composition comprises:
   (a) between 50 wt. % and 91 wt. % of a quaternary ammonium compound; and
   (b) between 9 wt. % and 50 wt. % of a polysaccharide based on the total weight of the solid composition;
   wherein the solid composition comprises less than 0.1 wt. % of water and the quaternary ammonium compound has the general formula (III):

$$[N^+((CH_2)_n\text{-}T\text{-}R_8)_2(R_8)(R_9)]_y X^-\qquad (III)$$

wherein:
R$_9$ group is independently selected from a C$_1$-C$_4$ alkyl or hydroxylalkyl group;
R$_8$ group is independently selected from a C$_1$-C$_{30}$ alkyl or alkenyl group;
T is —C(=O)—O— or —O—C(=O)—;
n is an integer from 0 to 5;
X is an anion; and
y is the valence of X.

13. The process according to claim 12, wherein the quaternary ammonium compound is melted to form the quaternary ammonium compound in liquid form, and the mixture is solidified by cooling the mixture.

* * * * *